Patented Nov. 11, 1952

2,617,913

UNITED STATES PATENT OFFICE 2,617,913

LOW OPEN CIRCUIT VOLTAGE ALTERNATING CURRENT WELDING CIRCUIT

Sol Oestreicher, Milwaukee, Wis., assignor to Harnischfeger Corporation, Milwaukee, Wis., a corporation of Wisconsin Application September 30, 1950, Serial No. 187,786

7 Claims. (Cl. 219—8)

This invention relates to alternating current welders and more specifically resides in a welding apparatus having a welding transformer and an impedance associated with circuit switching elements responsive to secondary winding circuit current whereby the impedance is placed in relationship with the transformer to provide a low open circuit voltage for the secondary winding circuit.

Voltage potentials required for maintenance of adequate welding currents are necessarily, during intervals when the arc is extinguished and welding has ceased, imposed across an electrode and a work piece in association with the welding apparatus. The values of such potentials are such as to cause injury to the human body and from the nature of welding apparatus an operator thereof may inadvertently expose himself to the potentials. As a consequence, several designs of equipment have heretofore been employed to safeguard the operator by providing open circuit voltages below prescribed maximum safety values.

The usual alternating current welder employs a variable high leakage reactance transformer or a separate variable reactor in conjunction with a transformer as a means for attaining voltage regulation. Upon flow of welding current voltage at the electrode falls below values incurred during open circuit prior to the striking of the arc; the reactance control and the nature of a free air arc contribute to this decrease in potential at the electrode. Thus, an apparatus that provides satisfactory protection to an operator must provide means whereby the electrode potential will be decreased during intervals of open circuit and it is an object of this invention to provide an improved apparatus to perform this function.

It is a further object of this invention to provide a low open circuit voltage at the welding electrode by control apparatus, both economical and simple in operation, that neither requires heavy contactors to carry large welding currents or control relays of a voltage selective type.

It is another object of this invention to provide an apparatus that may employ a welding transformer adapted for connection to power supplies of varying commercial voltages.

It is also an object of this invention to provide an apparatus which has its principal application to welders having a separate reactor control in the secondary circuit of a welding transformer.

These and other objects will become more apparent in the description to follow.

In the description reference is made to the accompanying drawings which form a part hereof and in which there is shown by way of illustration and not of limitation various forms in which this invention may be embodied.

Figure 1:
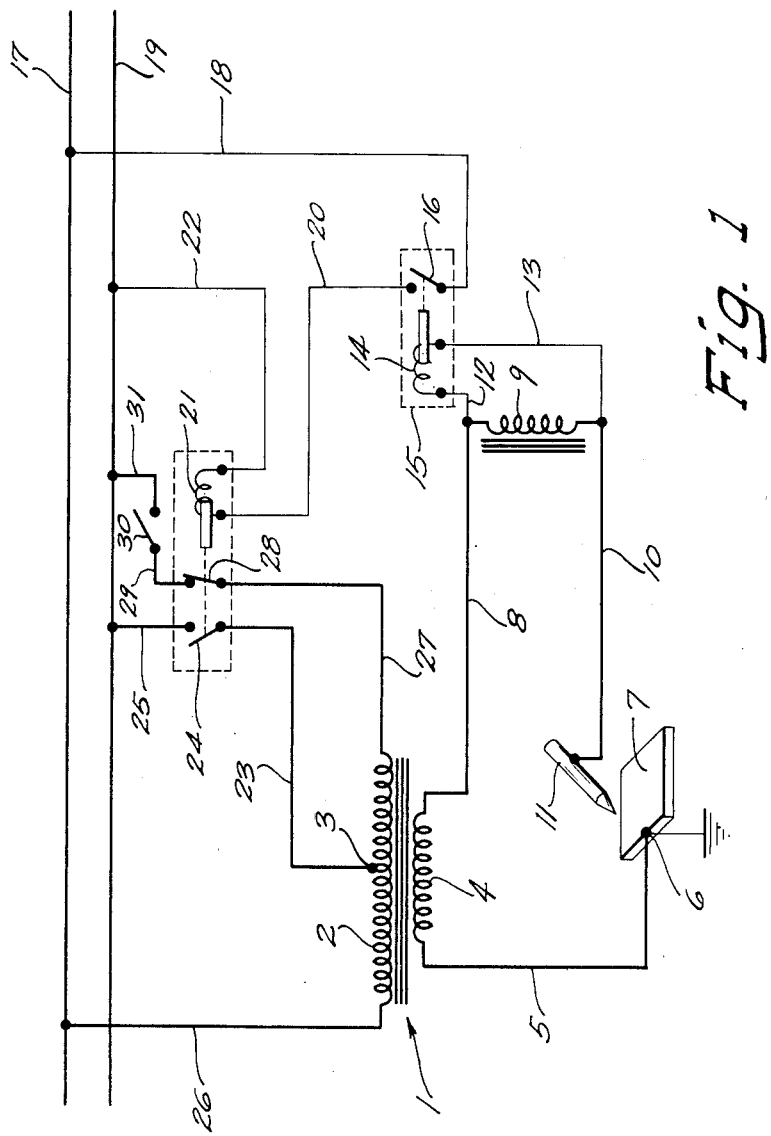
Fig. 1 is a schematic wiring diagram of an alternating current welder embodying this invention showing a welding transformer of which a portion of the primary is joined in active circuit relationship only during open circuit conditions of the secondary.

Referring now to the drawings. In Fig. 1 there is shown a welding transformer 1 with a primary winding 2 having a tap 3 and a secondary winding 4. While the tap 3 is depicted as a mid-tap it should be understood that it may be placed at any desired position along the winding 2. One end of the winding 4 connects to a lead 5 terminating in a grounded terminal 6 attached to a work piece 7. The opposite end of the winding 4 connects through lead 8 to an inductive reactance 9 and then through lead 10 to a welding electrode 11. The physical contact of welding electrode 11 to work piece 7 completes the secondary winding circuit and this circuit is said to be in open circuit when the welding electrode 11 is disengaged from work piece 7 and there is an absence of current flow.

Control circuit leads 12 and 13 terminate at one of the respective ends of each at the opposite ends of inductive reactance 9. The other ends of leads 12 and 13 connect to the coil 14 of control relay 15 which coil operates the normally open contactor 16 forming a part of the relay 15. The control circuit of the apparatus is completed by one contact of contactor 16 connecting to power line 17 through lead 18 and the other contact of contactor 16 connecting to power line 19 through lead 20, contactor coil 21 and lead 22.

The primary winding 2 of transformer 1 has the mid-tap terminal 3 connected to the power line 19 by means of a lead 23 joined to the mid-tap 3, normally open contactor 24 and lead 25. One end terminal of the winding 2 connects direct to power line 17 through the lead 26 as shown and the opposite end terminal connects to power line 19 through lead 27, normally closed contactor 28, lead 29, switch 30 and lead 31.

The closure of switch 30 impresses line voltage across the entire primary winding 2. The apparatus is designed in this circuit arrangement to induce a predetermined voltage potential in the winding 4 of a low value, which may for illustrative purposes be a value of approximately 40 volts. When the operator places the welding electrode 11 in physical contact with the work piece 7 a current will be allowed to flow in the secondary winding circuit and a voltage drop will appear across reactor 9. Reactor 9 is preferably a variable reactor controlled by saturation of a magnetic core through the use of an auxiliary winding not shown. Such a reactor is well known to the art, but this invention is not limited to the use of this type reactor. In response to the voltage produced across reactor 9 relay coil 14 will close contact 16 and impress line voltage across contactor coil 21. Normally closed contactor 26 will open and normally open contactor 24 will close upon the energization of the coil 21. Lead 23 from the mid-tap 3 of the winding 2 now connects to power line 19 and the lead 27 is removed from connection therewith. Thus, power line voltage is impressed across one-half of the winding 2 and the voltage induced in secondary winding 4 is approximately doubled to 80 volts, which voltage is of sufficient value to maintain welding currents upon striking an arc between the electrode 11 and work piece 7.

Upon extinguishment or interruption of the arc with a resultant stoppage of current flow in the secondary circuit relay 15 will be de-energized and the circuit elements will assume their original positions with the open circuit secondary voltage being reduced to a safe value. Thus one-half of the primary winding 2 is utilized for welding currents and by additional impedance being placed in relationship therewith during periods of open circuit secondary the secondary voltage is decreased in value. This additional impedance, in this form of the invention, is the portion of the primary 2 between the mid-tap 3 and lead 27.

Figure 2:
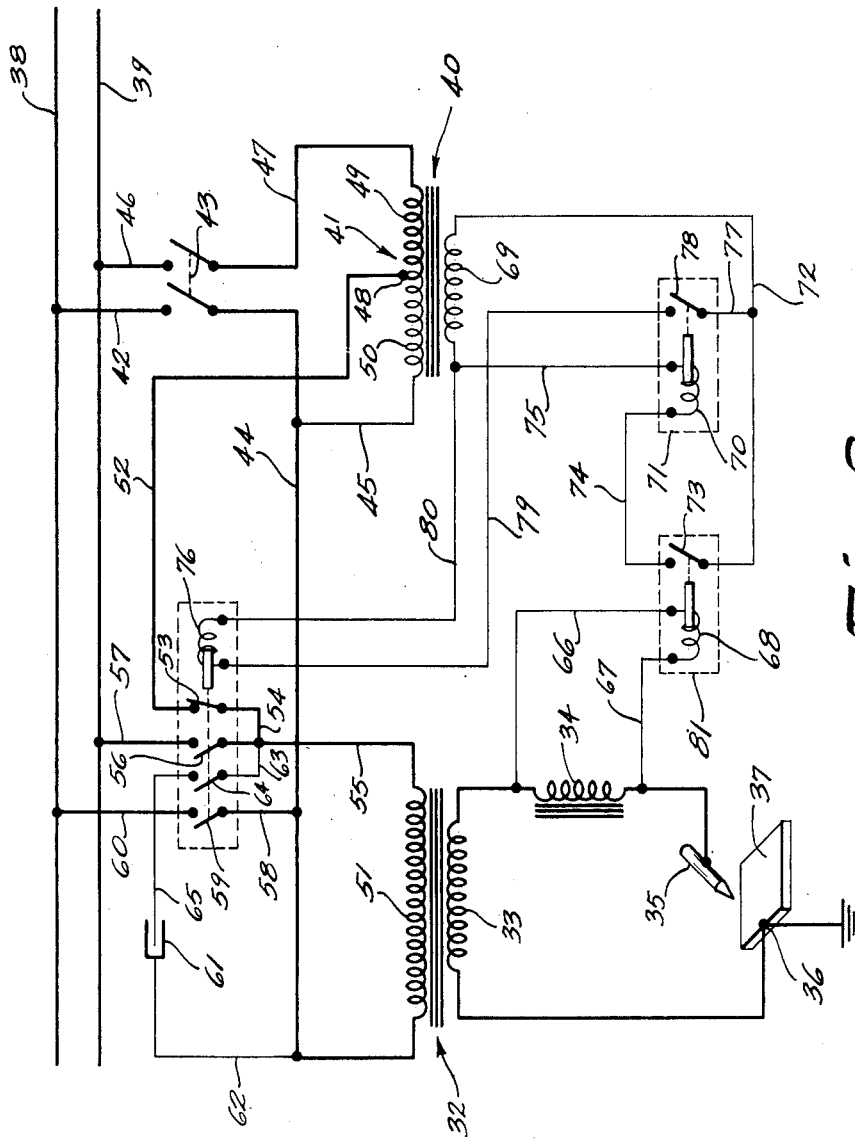
Fig. 2 is a schematic wiring diagram of an alternating current welder depicting another form of this invention.

Referring now to Fig. 2, another form of this invention is shown. In an arrangement similar to that of Fig. 1 a welding transformer 32 has a secondary winding 33 in series connection with a reactor 34, a welding electrode 35 and a terminal 36 connecting to a work piece 37. Power lines 38 and 39 supply voltage to a control transformer 40, line 38 connecting to one side of the primary winding 41 through lead 42, main switch 43, lead 44 and lead 45, the line 39 connecting to the other side of the winding 41 through lead 46, main switch 43 and lead 47. A tap 48 that divides primary winding 41 into sections 49 and 50 connects to one end of the primary winding 51 of the welding transformer 32 through the lead 52, normally closed contactor 53, lead 54 and lead 55. The lead 55 also joins power line 39 through normally open contactor 56 and lead 57. The left, or other end as shown, of the primary winding 51 joins the primary winding 41 of control transformer 40 through leads 44 and 45. The left end of winding 51 also joins power line 38 through the alternative paths of lead 44, main switch 43 and lead 42 or lead 44, lead 58, normally open contactor 59 and lead 60.

A power factor condenser 61 joins winding 51 in parallel relationship through leads 62, 44, 55, 63 normally open contactor 64 and lead 65.

In the control circuit leads 66 and 67 place coil 68 of the control relay 81 in parallel connection with the reactor coil 34. Secondary winding 69 of control transformer 40 forms a circuit with the coil 70 of time delay relay 71 through lead 72, normally open contactor 73 of the control relay 68, lead 74 and lead 75. Secondary winding 69 also forms a circuit with contactor coil 76 through the leads 72, 77, normally open contactor 78 of time relay relay 71, lead 79 and lead 80.

Closure of the main switch 43 places line voltage across the primary winding 41. A portion of this voltage is applied to the primary winding 51 of welding transformer 32 by reason of the series connection of the portion 49 of the winding 41 to winding 51. This portion 49 of the winding 41 acts as a voltage reducing impedance that is external to the welding transformer 32. The voltage induced in the secondary winding 33 is therefore materially lower in value than that which would occur upon connecting the primary winding 51 directly across the power lines 38 and 39. This voltage value corresponds to the 40 volts of the apparatus of Fig. 1.

As in the apparatus of Fig. 1 a voltage will appear across reactor 34 upon contact of electrode 35 with work piece 37 so as to operate a control relay. This relay 68 will close its contacts 73 to complete the circuit of coil 70 of time delay relay 71. The time delay feature of relay 71 is not operative upon closure, thus it will immediately close its contact 78 and the closure of contact 78 places the voltage of secondary winding 69 across contactor coil 76. Energization of coil 76 effects an opening of contact 53 and a closing of contacts 56, 59 and 63. The opening of contact 53 disengages primary winding 51 from the tap 48 of winding 41 and the closure of contacts 56 and 59 places the welding transformer 32 in direct connection with the power lines 38, 39. Winding 33 now has an increased value of induced voltage similarly as that of the apparatus of Fig. 1, suitable for maintaining a welding current upon the striking of an arc.

Upon interruption of the arc and welding current the control relay 68 will be de-energized, as similarly occurred in the apparatus of Fig. 1. Contact 73 will open to disconnect time delay relay coil 70 from the control voltage of secondary winding 69. The opening of contactor 78 of the time delay relay 71 will be delayed and only upon removal of the electrode 35 from the work piece 37 for a time interval of predetermined length, which time interval extends beyond arc extinguishment encountered in sporadic welding, will contactor coil 76 be relaxed so as to allow a reduction in the induced secondary voltage of the welding transformer 32.

By use of this invention a welding transformer may be adapted for use with more than one supply voltage. For instance, a 440 volt transformer may operate on a 440 volt line when connected as shown in Fig. 2 and may be operated on a 220 volt line when connected as shown in Fig. 1. Manufacture of welding transformers may thus be simplified by standardization of design.

I claim:

1. In an alternating current welder the combination comprising a transformer having a primary winding and a secondary winding; a welding electrode terminal electrically joined to one end of said secondary winding and a terminal for electrical connection to a work piece electrically joined to the opposite end of said secondary winding to form a secondary circuit therewith; a set of supply terminals adapted to be connected to a source of alternating current; a primary circuit voltage reducing impedance; a primary circuit contactor having an actuating coil, a set of reduced voltage contacts and a set of welding voltage contacts; reduced voltage circuit connections joining said primary winding through said reduced voltage contacts when closed and in series through said voltage reducing impedance to said supply terminals; welding voltage circuit connections joining said primary winding through said welding voltage contacts when closed directly to said supply terminals; and welding current responsive means interposed in the secondary circuit of said transformer connected to and adapted to energize the coil of said primary circuit contactor to cause said welding voltage contacts only to be closed when current is flowing in said secondary circuit and adapted to cause said reduced voltage contacts only to be closed when current is not flowing in said secondary circuit.

2. In an alternating current welder the combination comprising a transformer having a primary winding and a secondary winding; a welding electrode terminal electrically joined to one end of said secondary winding and a terminal for electrical connection to a work piece electrically joined to the opposite end of said secondary winding to form a secondary circuit therewith; a set of supply terminals adapted to be connected to a source of alternating current; a primary circuit voltage reducing impedance; a primary circuit contactor having an actuating coil, a set of normally closed reduced voltage contacts and a set of normally open welding voltage contacts; reduced voltage circuit connections joining said primary winding through said reduced voltage contacts when closed and in series through said voltage reducing impedance to said supply terminals; welding voltage circuit connections joining said primary winding through said welding voltage contacts when closed directly to said supply terminals; and switching means having contacts and a coil joined to said secondary circuit adapted to be energized by current flow in said secondary circuit to cause said contacts to be closed upon current flow in said secondary circuit and to be open when current is not flowing in said secondary circuit; and contactor coil circuit connections joining said contactor coil through said switching means contacts when closed to a voltage source to energize said contactor coil, said contactor coil causing said normally open welding voltage contacts to close and said normally closed reduced voltage contacts to open upon energization thereof.

3. In an alternating current welder the combination comprising a transformer having a secondary winding and a primary winding with a tapped terminal disposed between two end terminals; a welding electrode terminal, a terminal for electrical connection with a work piece and a reactor connected in series relationship with said secondary winding to form a secondary winding circuit; a set of supply terminals adapted to be joined to a source of alternating current; switching means having contacts and a coil connected in parallel relationship with said reactor adapted to be energized by current flowing in said secondary winding circuit and to cause closure of said contacts upon energization thereof; and a primary circuit contactor having a coil adapted to be joined to a voltage source for energization thereof through said switching means contacts, normally closed contacts adapted when closed to join the two end terminals of said primary winding to said set of supply terminals, and normally open contacts adapted when closed to connect said tapped terminal and one of said end terminals of said primary winding to said set of supply terminals, said normally closed contacts moving to open position and said normally open contacts moving to closed position upon energization of said contactor coil.

4. In an alternating current welder the combination comprising a welding transformer having a primary winding and a secondary winding; a welding electrode terminal, a terminal for electrical connection with a work piece and a reactor in series relationship with said secondary winding to form a secondary winding circuit; a voltage control transformer having a secondary winding and a primary winding with a tapped terminal disposed between two end terminals; a set of supply terminals adapted to be connected to a source of alternating current; a control relay having contacts and a coil in parallel circuit connection with said reactor adapted to be responsive to current flowing in said secondary winding circuit to cause said contacts to open and close; circuit switch means having coil means adapted to be connected to the secondary winding of said voltage control transformer through said relay contacts when closed, a set of welding voltage contacts and a set of reduced voltage contacts, reduced voltage circuit connections adapted to join said tapped terminal and one of said end terminals of said primary winding of said voltage control transformer and said primary winding of said welding transformer in series with one another and through said reduced voltage contacts to said supply terminals; and welding voltage circuit connections adapted to join said primary winding of said welding transformer through said welding voltage contacts when closed direct to said set of supply terminals; said welding voltage contacts and said reduced voltage contacts being closed alternatively with said welding voltage contacts in closed position upon response of said relay coil to current in said secondary winding circuit.

5. In an alternating current welder the combination comprising a welding transformer having a primary winding and a secondary winding; a welding electrode terminal, a terminal for electrical connection with a work piece and a reactor in series relationship with said secondary winding to form a secondary winding circuit; a voltage control transformer having a secondary winding and a primary winding with a tapped terminal disposed between two end terminals; a set of supply terminals adapted to be connected to a source of alternating current a control relay having contacts and a coil in parallel circuit connection with said reactor adapted to be energized by current flowing in said secondary winding circuit to cause said contacts to open and close; circuit switch means having a set of welding voltage contacts and a set of reduced voltage contacts joined to said control relay contacts and adapted to move said reduced voltage contacts and said welding voltage contacts between open and closed positions in response to energization and deenergization of said control relay coil, reduced voltage circuit connections adapted to join said tapped terminal and one of said end terminals of the primary winding of said voltage control transformer and said primary winding of said welding transformer in series with one another and through said reduced voltage contacts when closed to said supply terminals and welding voltage circuit connections adapted to join said primary winding of said welding transformer direct to said supply terminals; said welding voltage contacts and said reduced voltage contacts being closed alternatively with said welding voltage contacts being closed upon energization of said relay coil.

6. In an alternating current welder the combination comprising a welding transformer having a primary winding and a secondary winding; a welding electrode terminal electrically joined to one end of said secondary winding and a terminal for electrical connection to a work piece electrically joined to the opposite end of said secondary winding to form a secondary circuit therewith; a voltage control transformer having primary and secondary windings; a set of supply terminals adapted to be connected to a source of alternating current; a primary circuit contactor having an actuating coil, a set of reduced voltage contacts, and a set of welding voltage contacts; reduced voltage circuit connections joining said primary winding of said welding transformer through said reduced voltage contacts when closed and in series through said primary winding of said voltage control transformer to said supply terminals; welding voltage circuit connections joining said primary winding of said welding transformer through said welding voltage contacts when closed directly to said supply terminals; and welding current responsive means interposed in the secondary circuit of said transformer connected to and adapted to energize the coil of said primary circuit contactor to cause said welding voltage contacts only to be closed when current is flowing in said secondary circuit and adapted to cause said reduced voltage contacts only to be closed when current is not flowing in said secondary circuit.

7. In an alternating current welder the combination comprising a transformer having a secondary winding and a primary winding with a tapped terminal disposed between two end terminals; a welding electrode terminal electrically joined to one end of said secondary winding and a terminal for electrical connection to a work piece electrically joined to the opposite end of said secondary winding to form a secondary circuit therewith; a set of supply terminals adapted to be joined to a source of alternating current; a primary circuit contactor having an actuating coil, a set of reduced voltage contacts and a set of welding voltage contacts; reduced voltage circuit connections joining said end terminals of said primary winding through said reduced voltage contacts upon closure thereof to said supply terminals; welding voltage circuit connections joining said tapped terminal and one of said end terminals of said primary winding through said welding voltage contacts when closed to supply terminals; and welding current responsive means interposed in the secondary circuit of said transformer connected to and adapted to energize the coil of said primary circuit contactor to cause said welding voltage contacts only to be closed when current is flowing in said secondary circuit and adapted to cause said reduced voltage contacts only to be closed when current is not flowing in said secondary circuit.

SOL OESTREICHER.

REFERENCES CITED

The following references are of record in the file of this patent:

UNITED STATES PATENTS

| Number | Name | Date |
|---|---|---|
| 1,462,572 | Gravell | July 24, 1923 |
| 2,110,436 | Candy | Mar. 8, 1938 |
| 2,192,555 | Morelisse | Mar. 5, 1940 |
| 2,214,868 | Welch, Jr. | Sept. 17, 1940 |
| 2,249,457 | Catlett et al. | July 15, 1941 |
| 2,315,625 | King | Apr. 6, 1943 |
| 2,449,456 | Corco et al. | Sept. 14, 1948 |
| 2,486,165 | Journeaux | Oct. 25, 1949 |